Patented Feb. 7, 1950

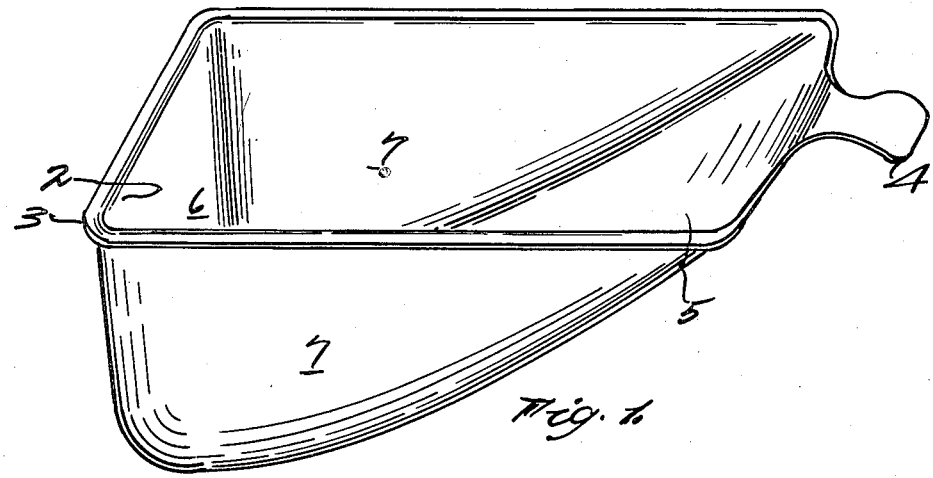
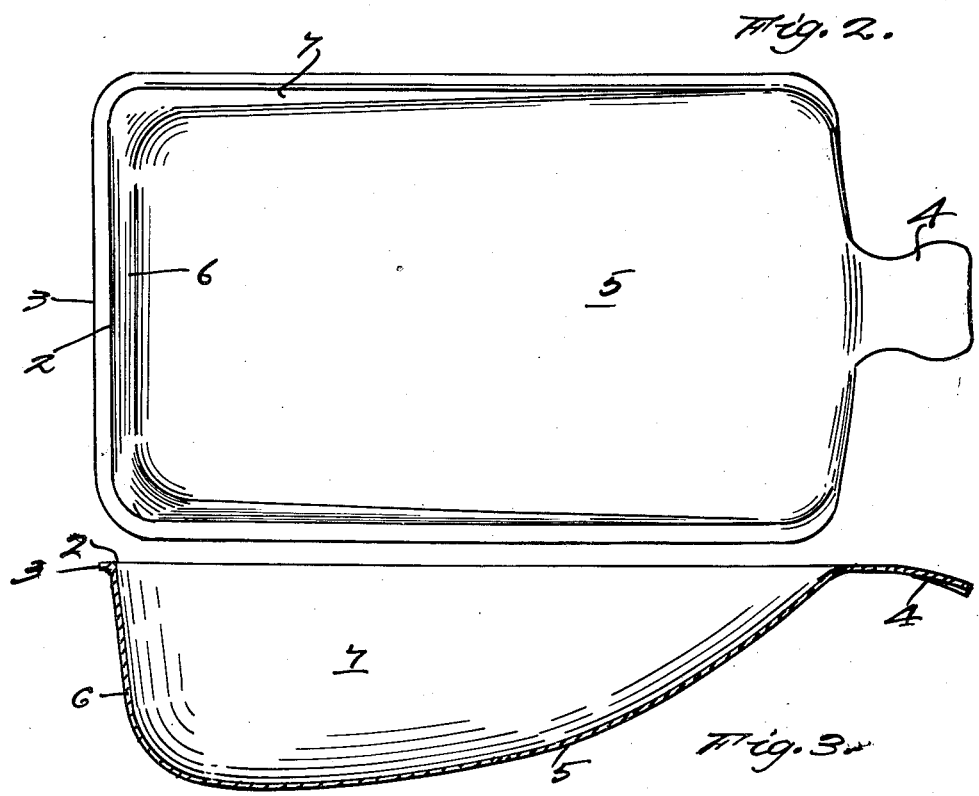

2,496,684

UNITED STATES PATENT OFFICE 2,496,684

REMOVABLE COLD WAVE OR DYE PAN FOR BEAUTICIANS' WASH SINKS

Fern G. Upchurch, Los Angeles, Calif.

Application August 8, 1946, Serial No. 689,172

1 Claim. (Cl. 4—159)

This invention is a removable or jury pan for use in combination with the conventional sink bowl of barber's or hair-dressers' chairs; the sinks being usually mounted on a room wall.

In beauticians parlors especially it is the technique to incline the customer's head in a position over a bowl at the back of the treatment chair and to ladle the treatment solution from the bowl and rinse it through the customer's head. In the case where the solution is a dye or tinting liquid this is very objectionable, and in any kind of wash at all it is objectionable because it is difficult to keep the usual sink bowl clean and sanitary, and some dye stains cannot be removed from the bowl only with much effort, if at all.

It is an object of the present invention to provide a means which will protect the head bowl from such dye and stain solutions and eliminate the time taking task of cleaning the bowl very frequently so that it may be kept in a fresh and sanitary condition at all times.

An object is to provide a readily mounted and as readily removed and easily and thoroughly cleaned guard or jury pan which is adapted to conformably fit onto the rim of the normal sink bowl to effectively catch the washing, tinting or dying liquids as one or the other is drained though the hair being treated, and to thus provide a convenient receptacle from which the liquid may be readily ladled back through the hair to the degree of time needed.

A purpose of the invention is to provide a seamless, substantially angle-less receptacle of more or less oblong plan and triangular longitudinal section, vertically, to conform to the given sink bowl; though this is but an example of the form.

And an object of the invention is to provide a simple, substantial, one-piece, low cost and light weight demountable, bowl protecting pan, preferably of a plastic substance of any desired color and highly resistive to re-agents as might be used in the hair treatment, and particularly which can be easily and thoroughly scalded for sanitation inside and out to make perfectly clean.

The invention resides in the advance in this art as set forth in the ensuing disclosure and having, with the above, additional objects and advantages as will be made manifest in the following description of the device and its details of means and the manner of operation; it being understood that modifications, variations and adaptations may be resorted to within the scope, spirit and principles of the invention as it is claimed in conclusion hereof.

Figure 1 is a perspective of the protective receptacle.

Figure 2 is a plan, and Figure 3 is a longitudinal section of the receptacle.

As here shown in one embodiment the pan has a top, generally rectangular rim 2 slightly outturned to form a narrow lip 3 at the outer end and sides and the inner end has a forwardly projected, central horn 4 slightly bent down to securely lodge on the neck margin of a hair dresser's sink bowl into which the present pan is closely nestable to be in a position under the head of hair being treated.

Starting at the horn end of the pan its bottom 5 inclines downward to the bottom of the front, deep, vertical wall 6. The side walls 7 and the end wall 6 join each other at the bottom 5 in wide curve intersections to eliminate sharp angles and promote ease of molding or pressing manufacture, and enable the pan to be well cleaned inside and out, and kept sanitary.

It will be seen that when the pan is lodged on the complementary rim of the given sink bowl the head of the customer is comfortably reclined over the pan and the treatment liquid is ladled and re-ladled from the pan and washed through the head of hair.

This results in an economy of the used solution, protection of the usual sink bowl both from being soiled and especially from being stained by the dyes, if used.

And after each operation or treatment the jury pan can be almostly instantly removed, quickly cleaned at a wash station and re-applied to a bowl.

What is claimed is:

A jury pan or receptacle having a bowl of generally oblong plan to nest into the space of a hairdresser's sink and having a flange rim on two sides and one end to lodge on the top edge of the bowl, the receptacle being of generally triangular, longitudinal cross-section with the deep end extending down from the end of the receptacle having the rim, and the opposite, apex end of the receptacle having at the center of its end edge an outwardly projecting, neck resting horn.

FERN G. UPCHURCH.

REFERENCES CITED

The following references are of record in the file of this patent:

UNITED STATES PATENTS

| Number | Name | Date |
|---|---|---|
| 758,770 | McCann | May 3, 1904 |
| 1,028,341 | Faerber | June 4, 1912 |

FOREIGN PATENTS

| Number | Country | Date |
|---|---|---|
| 51,350 | Switzerland | Jan. 11, 1911 |
| 323,015 | France | Feb. 21, 1903 |
| 340,368 | Italy | Mar. 12, 1936 |